United States Patent
Shimada (10) Patent No.: US 10,321,255 B2
(45) Date of Patent: Jun. 11, 2019

(54) SPEAKER LOCATION IDENTIFYING SYSTEM, SPEAKER LOCATION IDENTIFYING DEVICE, AND SPEAKER LOCATION IDENTIFYING METHOD

(71) Applicant: Yamaha Corporation, Hamamatsu-shi, Shizuoka (JP)

(72) Inventor: Hideaki Shimada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/923,741

(22) Filed: Mar. 16, 2018

(65) Prior Publication Data

US 2018/0270599 A1 Sep. 20, 2018

(30) Foreign Application Priority Data

Mar. 17, 2017 (JP) .................. 2017-053248

(51) Int. Cl.
*H04S 7/00* (2006.01)
*H04S 3/00* (2006.01)
*H04R 5/02* (2006.01)
*G06T 7/70* (2017.01)
*H04R 1/40* (2006.01)

(52) U.S. Cl.
CPC .............. *H04S 7/301* (2013.01); *G06T 7/70* (2017.01); *H04S 3/008* (2013.01); *H04S 7/303* (2013.01); *H04S 7/308* (2013.01); *H04R 1/403* (2013.01); *H04R 5/02* (2013.01); *H04R 2201/403* (2013.01); *H04S 2400/01* (2013.01)

(58) Field of Classification Search
CPC . H04R 5/02; H04S 3/008; H04S 7/301; H04S 7/308; H04S 2400/01; G06T 7/70
See application file for complete search history.

(56) References Cited

U.S. PATENT DOCUMENTS

| | | |
|---|---|---|
| 5,912,980 A | 6/1999 | Hunke |
| 6,741,273 B1 | 5/2004 | Waters et al. |
| 10,104,490 B2 | 10/2018 | Family et al. |
| 2009/0081948 A1 | 3/2009 | Banks et al. |
| 2011/0019844 A1 | 1/2011 | Chang |

(Continued)

FOREIGN PATENT DOCUMENTS

| | | |
|---|---|---|
| EP | 1 718 114 A1 | 11/2006 |
| JP | 2001-54200 A | 2/2001 |

(Continued)

OTHER PUBLICATIONS

Extended European Search Report issued in counterpart European Application No. 18162249.9 dated Aug. 20, 2018 (seven (7) pages).

(Continued)

*Primary Examiner* — Mark Fischer
(74) *Attorney, Agent, or Firm* — Crowell & Moring LLP (57) ABSTRACT

A speaker location identifying system includes a camera which acquires a photographed image. The speaker location system recognizes an image of a speaker included in the photographed image, specifies a position of the speaker, based on a position and size in the photographed image of the recognized speaker, and decides a parameter of an audio signal outputted to the speaker, based on the specified position of the speaker.

20 Claims, 9 Drawing Sheets

(56) References Cited

U.S. PATENT DOCUMENTS

| 2012/0113224 A1* | 5/2012 | Nguyen | G06K 9/0057 |
| | | | 348/46 |
| 2014/0369519 A1* | 12/2014 | Leschka | H03G 5/165 |
| | | | 381/74 |
| 2017/0201847 A1 | 7/2017 | Fujita | |
| 2017/0280265 A1* | 9/2017 | Po | H04S 7/30 |

FOREIGN PATENT DOCUMENTS

| JP | 2015-228625 A | 12/2015 |
| WO | WO 2008/0126161 A1 | 10/2008 |

OTHER PUBLICATIONS

Extended European Search Report issued in counterpart European Application No. 18166996.1 dated Aug. 27, 2018 (eight (8) pages).
Blank et al., "An Internet Protocol (IP) Sound System", Audio Engineering Society, Oct. 28-31, 2004, pp. 1-17, San Francisco, CA, XP040506960, (12 pages).
Japanese-language Office Action issued in counterpart Japanese Application No. 2017-053248 dated Feb. 12, 2019 with unverified English translation (seven pages).
Office Action for corresponding U.S. Appl. No. 15/951,433 dated Apr. 19, 2019 (15 pages).

* cited by examiner

SPEAKER LOCATION IDENTIFYING SYSTEM, SPEAKER LOCATION IDENTIFYING DEVICE, AND SPEAKER LOCATION IDENTIFYING METHOD

CROSS-REFERENCE TO RELATED APPLICATION

The present application claims priority from Japanese Application JP 2017-053248 filed on Mar. 17, 2017, the content of which is hereby incorporated by reference into this application.

BACKGROUND OF THE INVENTION

1. Field of the Invention

The present invention relates to a speaker location identifying system, a speaker location identifying device, and a speaker location identifying method.

2. Description of the Related Art

A system where multiple speakers are arranged is widely used, such as a 5.1-channel home theater system. For example, a microphone is arranged at the position of the listener to acquire a sound from a speaker, and a parameter such as a channel outputted to the speaker is determined according to the acquired sound (WO2008/126161).

When adjusting a system where multiple speakers are arranged, the user needs to place a microphone at the position where the user listens to music. During the adjustment, the user must be careful not to generate any sound that can result in noise. For example, when using portable speakers, the user tends to do installation work an increasing number of times. The burden on the user at the time of the adjustment is not negligible.

SUMMARY OF THE INVENTION

In view of the foregoing circumstances, it is an object of the invention to provide a speaker location identifying system, a speaker location identifying device, and a speaker location identifying method that can reduce the burden on the user when the user adjusts a sound outputted from a speaker.

To solve the foregoing problem, a speaker location identifying system according to the invention includes: a camera which acquires a photographed image; an image recognition unit which recognizes an image of a speaker included in the photographed image; a location unit which specifies a position of the speaker, based on a position and size in the photographed image of the recognized speaker; and a parameter decision unit which decides a parameter of an audio signal outputted to the speaker, based on the specified position of the speaker.

A speaker location identifying method according to the invention includes: acquiring a photographed image from a camera; recognizing an image of a speaker included in the acquired photographed image; specifying a position of the speaker, based on a position and size in the photographed image of the recognized speaker; and deciding a parameter of an audio signal outputted to the speaker, based on the specified position of the speaker.

A speaker location identifying device according to the invention includes: an image recognition unit which recognizes an image of a speaker included in a photographed image acquired by a camera; a location unit which specifies a position of the speaker, based on a position and size in the photographed image of the recognized speaker; and a parameter decision unit which decides a parameter of an audio signal outputted to the speaker, based on the specified position of the speaker.

The invention enables a reduction of the burden for the user at the time of adjusting a sound outputted from a speaker.

DETAILED DESCRIPTION OF THE INVENTION

An example of embodiment of the invention will be described below with reference to the drawings.

Figure 1:
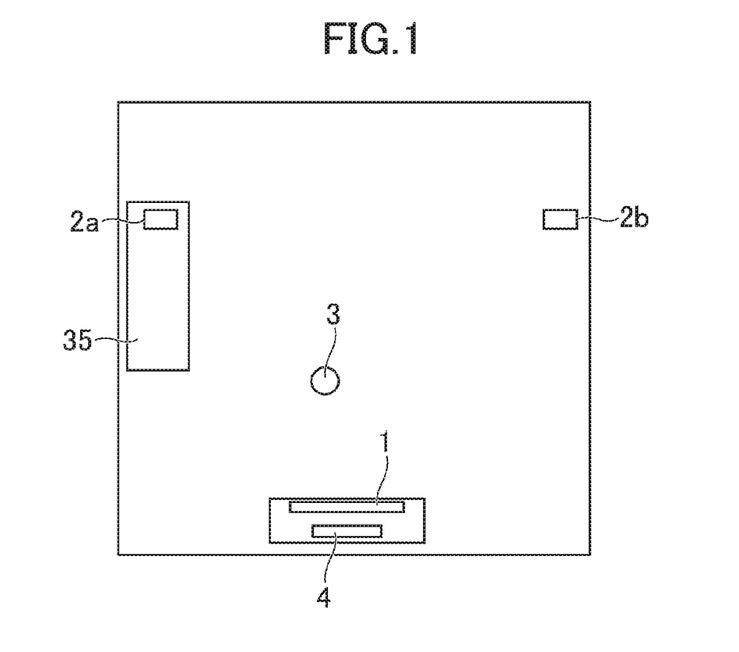
FIG. 1 is a plan view illustrating an example of a surround system according to an embodiment of the invention.

FIG. 1 is a plan view showing an example of a surround system according to the embodiment of the invention. The surround system includes a front unit 1 and a plurality of speaker units 2. The front unit 1 is arranged in front of a television 4 and outputs at least two channels of sound. Each speaker unit 2 outputs a sound, collaborating with the front unit 1. The surround system outputs a multi-channel sound outputted from the television 4 or the like, for example, and thus allows a listener 3 to enjoy music with a feeling like a live performance. In the example of FIG. 1, a speaker unit 2a is arranged on a piece of furniture 35. In FIG. 1, two speaker units 2a, 2b are arranged as the plurality of speaker units 2. However, a greater number of speakers 2 may be arranged, or a single speaker unit 2 may be arranged.

Figure 2:
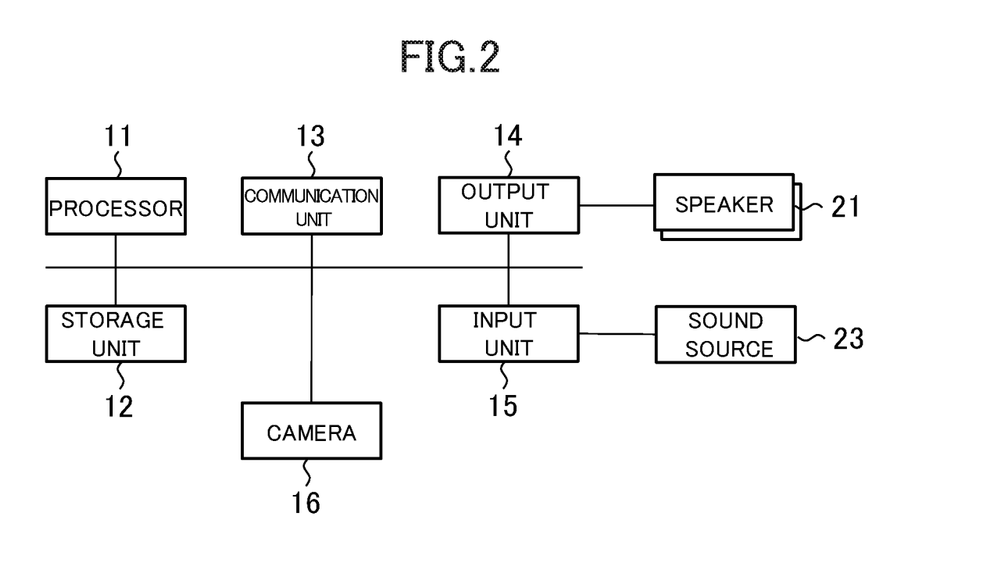
FIG. 2 is a block diagram schematically showing the hardware configuration of a front unit.
Figure 3:
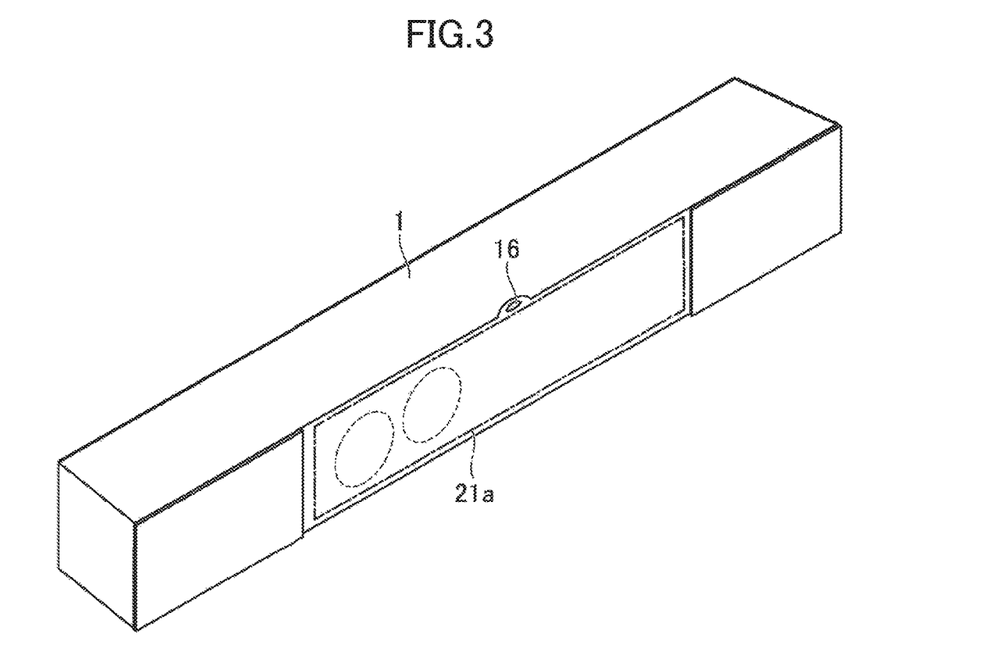
FIG. 3 is a perspective view showing the appearance of the front unit.

The front unit 1 is an apparatus generally called a sound bar. FIG. 2 is a block diagram schematically showing the hardware configuration of the front unit 1. FIG. 3 is a perspective view showing appearance of the front unit 1. The front unit 1 includes a processor 11, a storage unit 12, a communication unit 13, an output unit 14, an input unit 15, a camera 16, and a speaker 21. The speaker 21 includes an array speaker 21a. The input unit 15 is connected to a sound source 23 such as the television 4 or another audio apparatus.

The front unit 1 has a horizontally long shape and is generally arranged parallel to the lateral direction of the screen of the television 4. The array speaker 21a made up of multiple speakers 21 arrayed in the lateral direction is arranged in the front unit 1. The phase of a sound outputted from each of the multiple speakers 21 may be adjusted to output a highly directional sound that travels in an arbitrary direction. Also, two speakers 21 spaced apart from each other may be arranged instead of the array speaker 21a.

The processor 11 operates according to a program stored in the storage unit 12 and controls the communication unit 13, the camera 16, the output unit 14, and the input unit 15. The program may be stored in a computer-readable storage medium such as a flash memory, or may be provided via a network.

The storage unit 12 is configured of a memory element such as a DRAM or flash memory. The storage unit 12 stores the program. The storage unit 12 also stores information and results of computation inputted from the processor 11 and the communication unit 13 or the like.

The communication unit 13 is configured of an integrated circuit, a connector, an antenna and the like which form a wired LAN, wireless LAN, or Bluetooth (trademark) transceiver. The communication unit 13 communicates with other devices via a network. The communication unit 13, under the control of the processor 11, inputs information received from the other devices to the processor 11 and the storage unit 12 and transmits information to the other devices.

The output unit 14 includes, for example, a DA converter and a headphone terminal and is connected to the speakers 21 or the like. The input unit 15 includes a line input terminal, an AD converter, a digital audio input interface, and an HDMI (trademark) input interface.

The camera 16 is arranged on the front side of the front unit 1 and photographs the scene in front of the front, unit 1. The camera 16 photographs, for example, an image including the listener 3 and the speaker units 2a, 2b situated in front of the front unit 1.

The front unit 1 need not necessarily has the built-in speakers 21 and need not be a sound bar, either. For example, the front unit 1 may be an AV amplifier equipped with the camera 16. In this case, L-channel and R-channel speakers may be connected to the AV amplifier.

Figure 4:
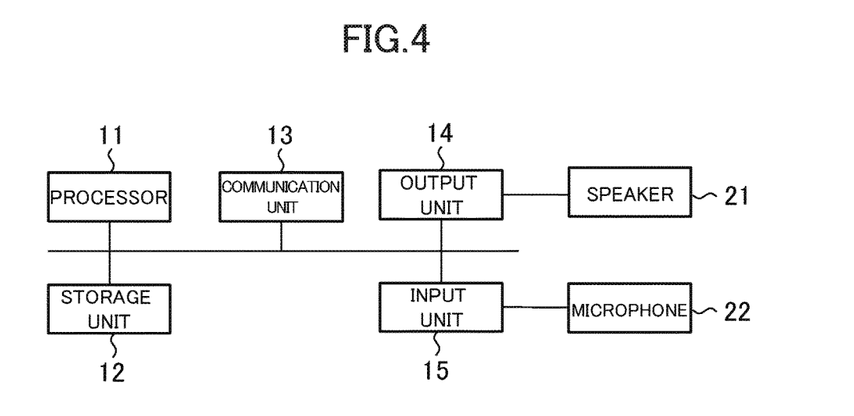
FIG. 4 is a block diagram schematically showing the hardware configuration of a speaker unit.

FIG. 4 is a block diagram schematically showing the hardware configuration of the speaker unit 2. FIG. 4 shows an example of the speaker unit 2 generally called a wireless speaker. The speaker unit 2 includes the processor 11, the storage unit 12, the communication unit 13, the output unit 14, the input unit 15, the speaker 21, and a microphone 22. The processor 11, the storage unit 12, and the communication unit 13 are similar to those included in the front unit 1 and therefore will not be described further in detail. The output unit 14 includes, for example, a DA converter and is connected to the speaker 21. The input unit 15 includes an AD converter and is connected to the microphone 22.

The speaker unit 2 wirelessly receives audio data from an apparatus such as the front unit 1 and outputs a sound represented by the audio data from the built-in speaker 21. The audio data is received via the communication unit 13. The speaker unit 2 may be connected to the front unit 1 or an amplifier via a cable.

Figure 5:
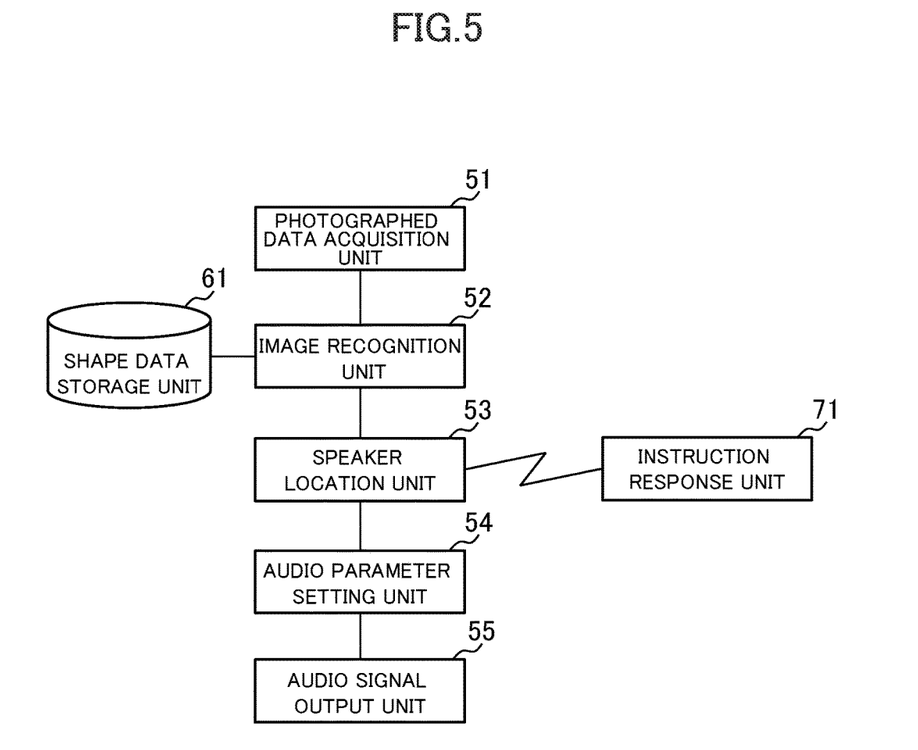
FIG. 5 is a block diagram showing the functional configuration of the surround system.

FIG. 5 is a block diagram showing the functional configuration of the surround system. Functionally, the surround system includes a photographed data acquisition unit 51, an image recognition unit 52, a speaker location unit 53, an audio parameter setting unit 51, an audio signal output unit 55, a shape data storage unit 61, and an instruction response unit 71. The photographed data acquisition unit 51, the image recognition unit 52, the speaker location unit 53, the audio parameter setting unit 54, and the audio signal output unit 55 are implemented by the processor 11 included in the front unit 1 executing a program stored in the storage unit 12 and thus controlling the communication unit 13 and the camera 16. The shape data storage unit 61 is, for example, a storage area that is a part of the storage unit 12 of the front unit 1. The instruction response unit 71 is implemented by the processor 11 included in the speaker unit 2 executing a program stored in the storage unit 12 and thus controlling the communication unit 13 and the input unit 15.

Here, for example, at least a part of the photographed data acquisition unit 51, the image recognition unit 52, the speaker location unit 53, and the audio parameter setting unit 54 may be implemented by another apparatus having the processor 11, the storage unit 12, and the communication unit 13, such as a smartphone or a server on a so-called cloud. The shape data storage unit 61 may be a part of the storage unit 12 of the smartphone or the server.

The photographed data acquisition unit 51 acquires data of a photographed image photographed by the camera 16. The photographed data acquisition unit 51 may acquire data directly from the camera 16 or may acquire, via the communication unit 13, data of a photographed image photographed by the camera 16 installed on another apparatus.

The image recognition unit 52 recognizes an image of the speaker unit 2 included in the photographed image. The image recognition unit 52 also recognizes an image of a remote controller 31 or the listener 3 included in the photographed image. The shape data storage unit 61 stores data representing an image of one or more predetermined types of speaker units 2. The image recognition unit 52 matches the photographed image with the shape of the speaker unit 2 represented by the data stored in the shape data storage unit 61 and thus recognizes the image of the speaker unit 2 included in the photographed image.

The speaker location unit 53 specifies the spatial position of the speaker unit 2, based on the position and size within the photographed image of the recognized speaker unit 2. The processing carried out by the speaker location unit 53 will be described in detail later. If the photographed data acquisition unit 51, the image recognition unit 52, and the speaker location unit 53 are implemented by another apparatus such as a smartphone or a server on a cloud, this apparatus may acquire the data of the photographed image via the communication unit 13 and may transmit the specified position of the speaker unit 2 to the apparatus implementing the audio parameter setting unit 54.

The audio parameter setting unit 51 decides a parameter of an audio signal outputted to the speaker unit 2, based on the specified spatial position of the speaker unit 2. More specifically, the audio parameter setting unit 54 decides a channel of an audio signal allocated to the speaker unit 2, based on the spatial position of the speaker unit 2. The audio parameter setting unit 54 may also decide a parameter related to correction of the audio signal, such as correction of the amount of delay or frequency characteristic of the audio output.

The audio signal output unit 55 outputs the audio signal to the speaker 21 included in the front unit 1 or to the speaker unit 2, based on the decided parameter and an audio signal supplied from the sound source 23. The audio signal may be an electrical signal or may be data. The outputted audio signal causes a sound to be outputted from the speaker 21 included in the front unit 1 or the speaker unit 2.

The instruction response unit 71 executes processing corresponding to an instruction outputted through the processing by the speaker location unit 53 and thus responds by communication via the communication unit 13 or by other outputs. Details of the processing by the instruction response unit 71 will be described later.

Figure 6:
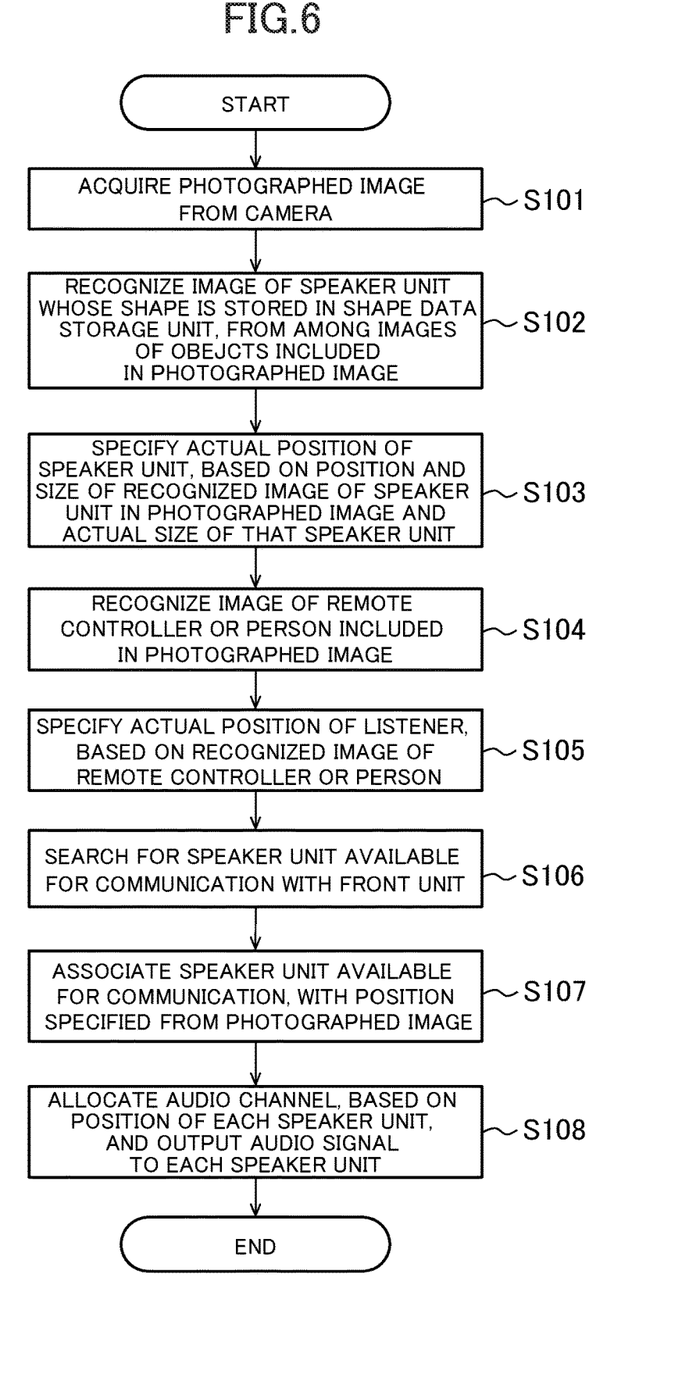
FIG. 6 is a flowchart showing an example of processing by the front unit.

In the description below, details of the processing in which the front unit 1 specifies the position of the speaker unit 2 and decides a parameter of an audio signal will be described. FIG. 6 is a flowchart showing an example of the processing by the front unit 1. The following processing may be carried out by another device such as a smartphone unless state otherwise. The processing shown in FIG. 6 is started by the user pressing a button or the like, as an instruction to adjust the output of the speaker unit 2.

Figure 7:
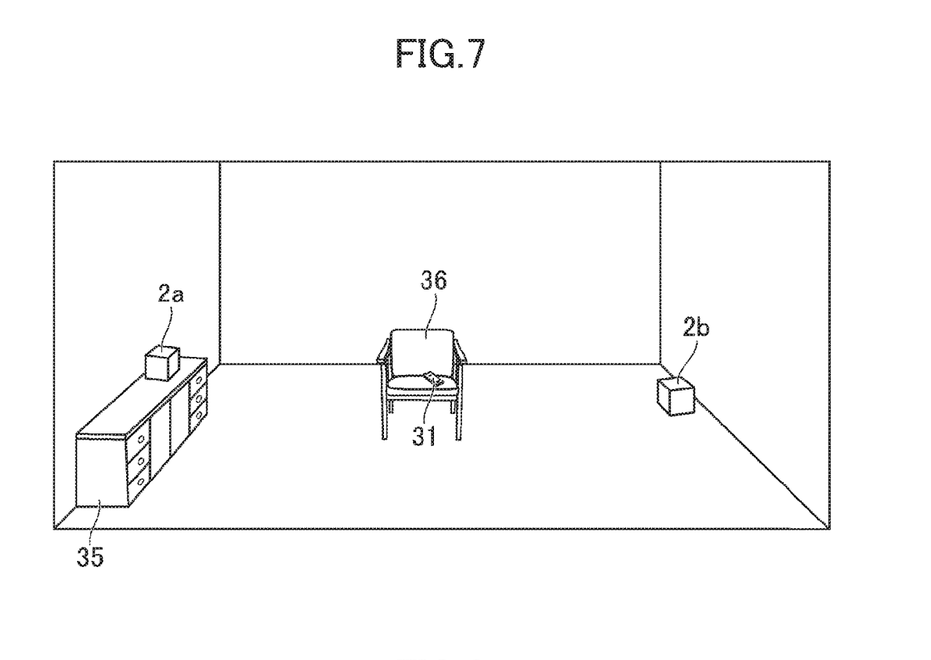
FIG. 7 shows an example of a photographed image photographed by a camera.

First, the photographed data acquisition unit 51 acquires data of a photographed image photographed by the camera 16 (step S101). FIG. 7 shows an example of the photographed image photographed by the camera 16. The example of FIG. 7 is an image corresponding to the arrangement of the speaker unit 2 shown in FIG. 1. A chair 36 is placed at the position of the listener 3. The remote controller 31 is arranged on the chair 36. A person may be there at the position of the listener 3.

Next, the image recognition unit 52 recognizes an image of the speaker unit 2 whose shape is stored in the shape data storage unit 61, among images of objects included in the photographed image represented by the photographed image data (step S102). Data representing features of an image of each of speaker units 2 with various model numbers, as viewed from various directions, are stored in the shape data storage unit 61. The image recognition unit 52, for example, slices out an image of an object from the photographed image and normalizes the size of the image of the object. The image recognition unit 52 then matches the normalized image with the features of the image of the speaker unit 2 stored in the shape data storage unit 61. If the image of the object has matched the features of the speaker unit 2, the image recognition unit 52 recognizes the image of the object as the image of the speaker unit 2. The image recognition unit 52 also acquires the model number and actual size of the speaker unit 2 of the matching features, from the shape data storage unit 61.

When the image of the speaker unit 2 is recognized, the speaker location unit 53 specifies the actual position of the speaker unit 2, based on the position and size of the recognized image of the speaker unit 2 in the photographed image and a value expressing the actual size of the speaker unit 2 (step S103).

Figure 8:
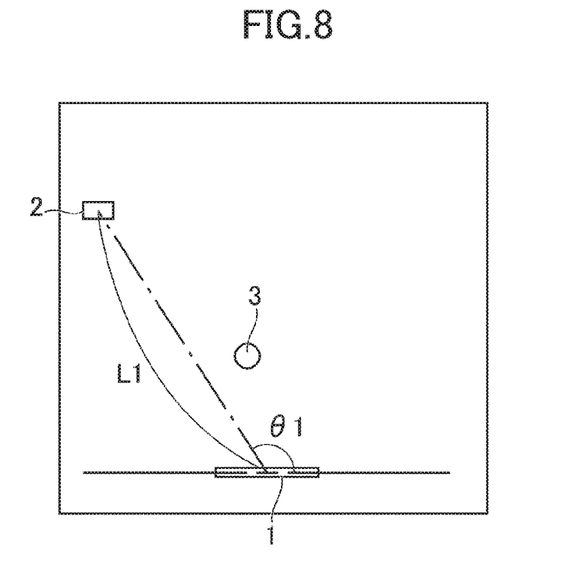
FIG. 8 illustrates a positional relation between the speaker unit and the front unit.

FIG. 8 illustrates the positional relation between the speaker unit 2 and the front unit 1. The speaker location unit 53 calculates an angle θ1 of the speaker unit 2 as viewed from the front unit 1, based on the position of the center of the speaker unit 2 in the photographed image. The speaker location unit 53 also finds a distance L1, based on the ratio of the size of the image of the speaker unit 2 in the photographed image to the value expressing the actual size. Here, details of the techniques for finding the angle θ1 and the distance L1 based on the position in the photographed image are known and therefore will not be described further in detail. The speaker location unit 53 may find three-dimensional coordinates of the speaker unit 2, defining a forward direction from the front unit 1 as a z-axis, an up-down direction as a y-axis, and a left-right direction as an x-axis by another known technique, instead of finding the angle θ1 and the distance L1. The speaker location unit may also find the distance L1 or the three-dimensional coordinates by another technique such as distance recognition with a stereo camera. It is also possible to calculate the angle θ1 only, as the actual position of the speaker unit 2.

When the actual position of the speaker unit 2 is specified, the speaker location unit 53 recognizes an image of the remote controller 31 or the person included in the photographed image (step S104). The speaker location unit 53 recognizes an image of the person's face included in the photographed image, by a known facial recognition technique. The speaker location unit 53 also recognizes an image of the remote controller 31 included in the photographed image. Data representing features of the image of the remote controller 31 as viewed from various directions are stored in the shape data storage unit 61. The image recognition unit 52 matches the normalized image of the object with the features of the image of the remote controller 31 stored in the shape data storage unit 61. If the image of the object has matched the features of the remote controller 31, the image recognition unit 52 recognizes the image of the object as the image of the remote controller 31.

The speaker location unit 53 specifies the actual position of the listener 3, based on the recognized image of the remote controller 31 or the person (step S105). More specifically, the speaker location unit 53 specifies the position of the listener 3, based on the position and size of the recognized image of the person's face, or the position and size of the recognized image of the remote controller 31 and a value expressing the actual size of the remote controller 31. The processing of steps S104 and S105 may be carried out before or in parallel with the processing of steps S102 and S103.

Figure 9:
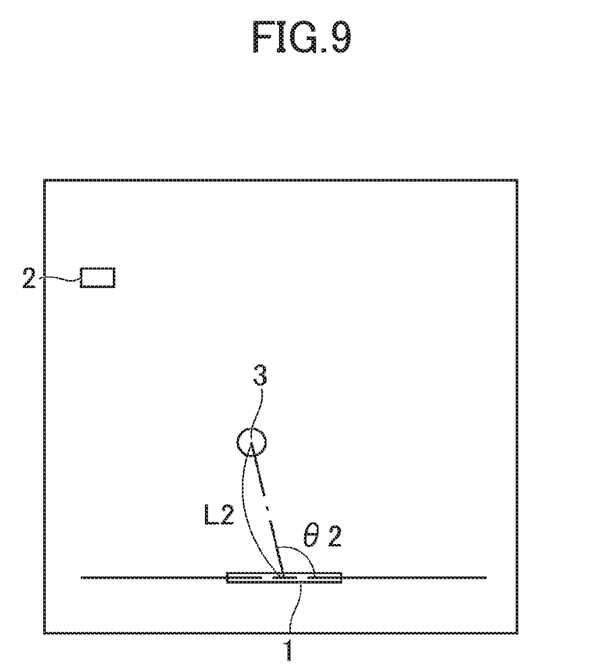
FIG. 9 illustrates a positional relation between a listener and the front unit.

FIG. 9 illustrates the positional relation between the listener 3 and the front unit 1. The speaker location unit 53 calculates an angle θ2 of the listener 3 from the front unit 1, based on the position of the listener 3 in the photographed image. The speaker location unit 53 also finds a distance l2, based on the ratio of the size of the image of the remote controller 31 in the photographed image to the value expressing the actual size. The speaker location unit 53 may find the distance L2, based on the position of the person's feet whose face image is recognized, in the photographed image, or the actual size of the face estimated as the size of the recognized image of the face. The speaker location unit 53 may also find three-dimensional coordinates of the listener 3 by another known technique, instead of finding the angle θ2 and the distance l2. The speaker location unit 53 may find the distance L2 and the three-dimensional coordinates by another method such as distance recognition with a stereo camera.

When the positions of the speaker unit 2 and the listener are specified, the speaker location unit 53 searches for the speaker unit 2 available for communication with the front unit 1 (step S106). Specifically, if the front unit 1 and the speaker units 2 are connected via a wireless LAN, the speaker location unit 53 detects, for example, the speaker unit 2 belonging to the same segment as the front unit 1 as the speaker unit 2 available for communication. The speaker location unit 53 may detect the speaker unit 2 wired to the front unit 1, as the speaker unit 2 available for communication.

Next, the speaker location unit 53 associates each of the speaker units 2 available for communication, with a position specified from the photographed image (step S107). The speaker units 2 recognized from the photographed image are specified in terms of shape and position only. Therefore, each of the speaker units 2 cannot necessarily be identified uniquely. For example, if a plurality of speaker units 2 with the same model number are arranged, the relation between the individual speaker units 2 specified by apparatus ID or the like and the speaker units 2 in the photographed image is unclear. Step S107 clarifies the actual position of each individual speaker unit 2 to be the destination of an audio signal.

Figure 10:
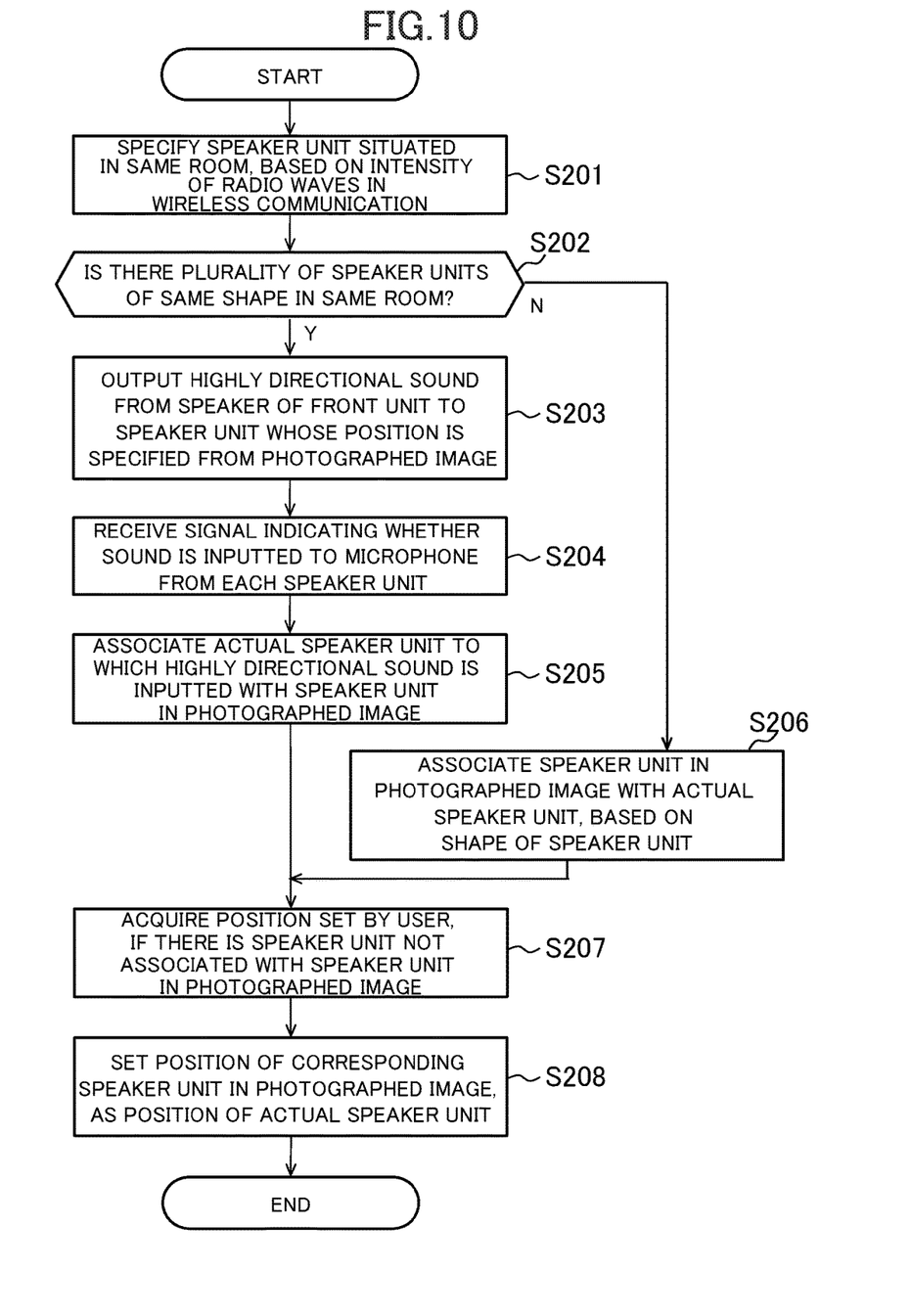
FIG. 10 is a flowchart showing an example of processing in which the speaker unit and a position specified from a photographed image are associated with each other.

FIG. 10 is a flowchart showing an example of the processing in which the speaker unit 2 and the actual position specified from the photographed image are associated with each other. FIG. 10 shows details of the processing of step S107.

In the processing of step S107, first, the speaker location unit 53 specifies the speaker unit 2 situated in the same room as the front unit 1, based on the intensity of radio waves in wireless communication (step S201). For example, the speaker location unit 53 may specify the speaker unit 2 situated in the same room as the front unit 1, based on whether the intensity of received radio waves in Bluetooth (trademark) communication between the front unit 1 and the speaker unit 2 is larger than a threshold or not, or may specify the speaker unit 2 situated in the same room, based on the intensity of radio waves at the time of ad-hoc connection in a wireless LAN.

Next, the speaker location unit 53 determines whether there is a plurality of speaker units 2 of the same shape situated in the same room or not (step S202). More specifically, the speaker location unit 53 acquires information of the model number of each of the speaker units 2 from each of the speaker units 2 and determines whether there is a plurality of speaker units 2 of the same shape, based on whether there is any other speaker unit 2 of the same model number or not.

If there are not a plurality of speaker units 2 of the same shape (N in step S202), the speaker location unit 53 associates the speaker unit 2 recognized in the photographed image with the actual individual speaker unit 2, based on the shape of the speaker units 2 (step S206).

Meanwhile, if there are a plurality of speaker units 2 of the same shape (Y in step S202), the speaker location unit 53 executes the processing of steps S203 to S205. In step S203, the speaker location unit 53 transmits a signal indicating the output of a highly directional sound to each of the speaker units 2. The speaker location unit 53 then outputs a highly directional sound from the speaker 21 of the front unit 1 to the speaker unit 2 whose position is specified from the photographed image (step S203).

Figure 11:
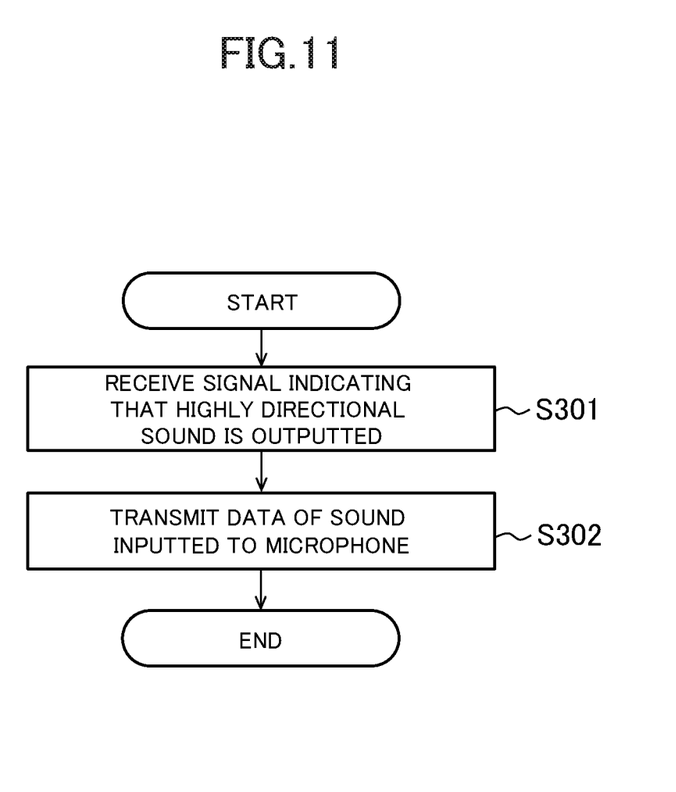
FIG. 11 is a flowchart showing an example of processing by an instruction response unit of the speaker unit.

FIG. 11 is a flowchart showing an example of the processing by the instruction response unit 71 of the speaker unit 2. The processing shown in FIG. 11 is implemented by the processor 11 included in the speaker unit 2 executing a program stored in the storage unit 12. In the processing shown in FIG. 11, the front unit 1 is the counterpart in the data transmission/reception of steps S203 to S204 of FIG. 10.

First, the instruction response unit 71 receives the signal transmitted from the front unit 1 and indicating that a highly directional sound is outputted (step S301). The instruction response unit 71 then acquires data of a sound inputted to the microphone 22 and transmits the data of the sound to the front unit 1 (step S302). Here, the instruction response unit 71 may transmit the time when the highly directional sound is detected, instead of the data of the sound.

Next, the speaker location unit 53 receives a signal indicating whether a sound is inputted to the microphone 22 or not, from each of the speaker units 2 (step S204). This signal may be data of the sound inputted to the microphone 22 or may be the time when the sound is detected by the microphone 22. The speaker location unit 53 specifies the speaker unit 2 to which the highly directional sound is inputted, based on the received signal, and associates the actual individual speaker unit 2 to which the sound is inputted with the speaker unit 2 in the photographed image (step S205).

There are cases where a part of the actual speaker units 2 is not recognized in the photographed image because one or some speaker units 2 do not appear in the photographed image. Thus, the following processings carried out in the processing of step S207. The speaker location unit 53 determines whether there is one or more speaker units 2 which are situated in the same room as the camera 16 and not associated with the speaker units 2 in the photographed image. If it is determined that there is one or more speaker units 2 which are not associated, the speaker location unit 53 causes an apparatus such as a smartphone associated with the front unit 1 to output a message notifying that there is the speaker unit 2 which is not associated and prompting input of the position. The speaker location unit 53 also acquires the position of the speaker unit 2 inputted by the user to an apparatus such as a smartphone. As a method for owing the user to input the position, the speaker location unit 53 may control the smartphone to display on its screen a typical arrangement of the speaker units 2 and may acquire the position of the speaker unit 2 selected from the screen. Also, the speaker location unit 53 may control the smartphone to display the photographed image photographed by the camera 16. When the user touches a position where the speaker unit 2 is hidden, the speaker location unit 53 may acquire the position of the speaker unit 2 estimated from the touched position.

When the actual individual speaker units 2 and the speaker units 2 in the photographed image are associated with each other, the speaker location unit 53 sets, as the position of each of the actual speaker units 2, the position found for the speaker unit 2 in the photographed image corresponding to the actual speaker unit 2 (step S208). Thus, each of the speaker units 2 available for communication and the position specified from the photographed image are associated with each other.

After each of the speaker units 2 available for communication and the actual position specified from the photographed image are associated with each other by the processing of step S107, the processing of step S108 is executed. In step S108, the audio parameter setting unit 54 allocates an audio channel to each of the speaker units 2, based on the position of each of the speaker units 2. Here, the audio parameter setting unit 54 may determine whether the speaker unit 2 is ahead of or behind the listener 3, and whether the speaker unit 2 is to the right or to the left of the listener 3, and may decide the audio channel to be allocated according to the result of the determination. The audio parameter setting unit 54 may also decide parameters such as the amount of delay and frequency characteristics of the audio signal outputted to each speaker unit 2, as well as the channel.

After the processing of step S108 is executed, the audio signal output unit 55 outputs an audio signal corresponding to the allocated audio channel or the like, to each speaker unit 2.

The processing described up to this point reduces the time and effort for the user to set parameters such as the channel of the audio signal outputted by the speaker unit 2. The position of the speaker unit 2 can be specified from the photographed image photographed by the camera 16. Also, the processing shown in FIG. 12 enables proper setting of parameters about the audio signal even if there are plurality of speakers of the same shape. As the position of the listener 3 is specified from the photographed image, the relative position of the speaker unit 2 and the listener 3 can be detected. For example, which of the listener 3 and the speaker unit 2 is ahead of the other is known. Therefore, the channel allocated to the speaker unit 2 can be properly set.

Figure 12:
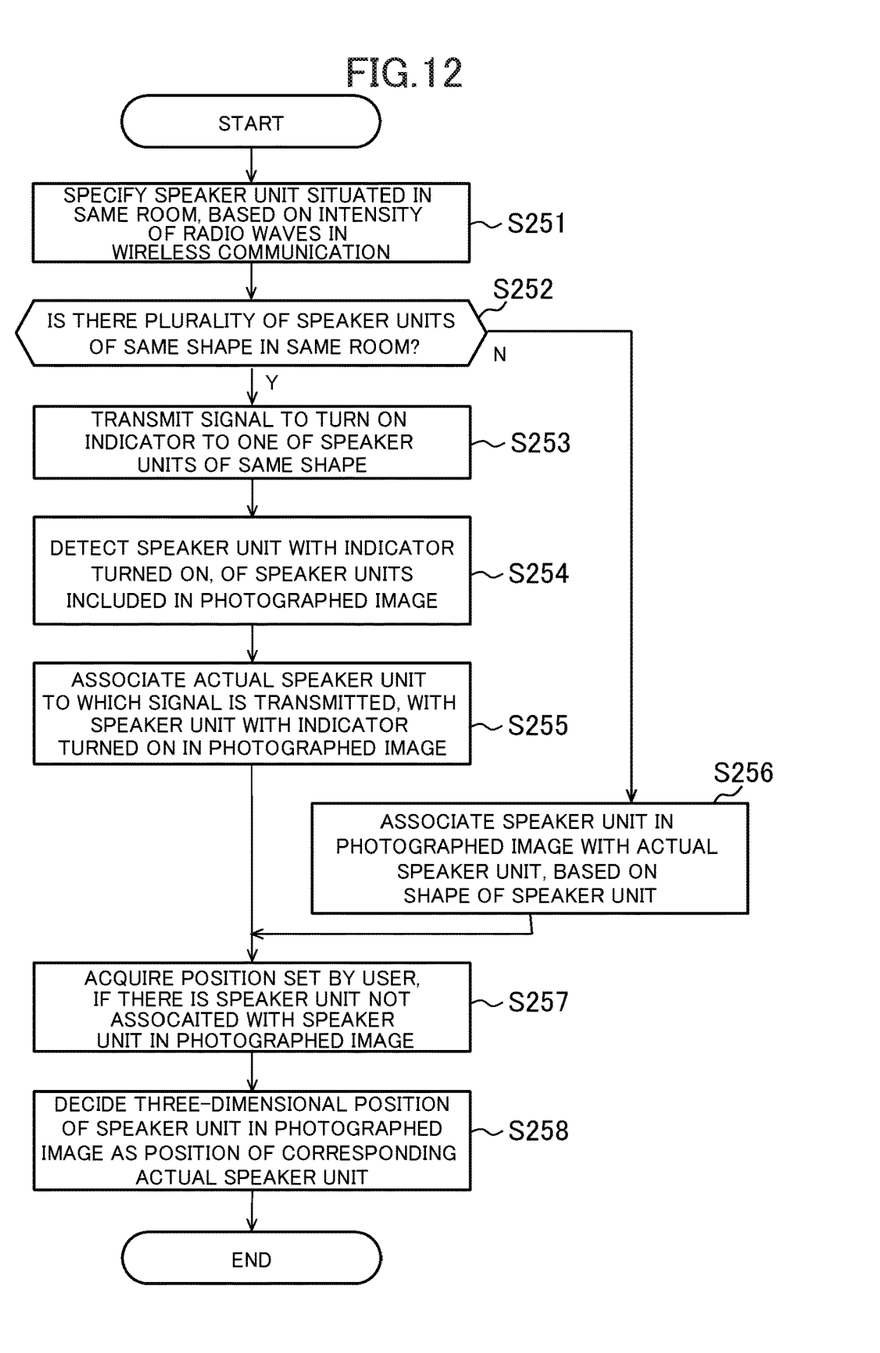
FIG. 12 is a flowchart showing another example of the processing in which the speaker unit and a position specified from a photographed image are associated with each other.

FIG. 12 is a flowchart showing another example of the processing in which the speaker unit 2 and the position specified from the photographed image are associated with each other. In the example of FIG. 12, the processing of steps S251, S252, S256 to S258 is the same as the processing of steps S201, S202, S206 to S208 of FIG. 10 and therefore will not be described further in detail.

In the processing of FIG. 12, if there are a plurality of speaker units 2 of the same shape in the same room (Y in step S252), the speaker location unit 53 transmits, to one of the speaker units 2, a signal to turn on an indicator included in the speaker unit (step S253). In this case, the instruction response unit 71 included in the speaker unit 2 receives the signal to turn on the indicator and then turns on the indicator of the speaker unit 2.

The speaker location unit 53 then acquires data of a newly photographed image from the camera 16 and detects the speaker unit 2 with the indicator turned on (step S254). The speaker location unit 53 then associates the actual individual speaker unit 2 that is the destination of the signal, with the speaker unit 2 situated at the position where the indicator is turned on in the photographed image.

In the example of FIG. 12, unlike the example of FIG. 11, the speaker unit 2 which receives the signal is made to output light or the like. Thus, the speaker unit 2 that is the designation of the signal and the speaker unit 2 in the image are associated with each other. The position of the actual individual speaker unit 2 is thus found uniquely. In the example of FIG. 12, the position of the actual individual speaker unit 2 is found uniquely even if the array speaker 21a is not built in the front unit 1. It is also possible to cause the speaker unit 2 to output a sound instead of light and allow the front unit 1 to specify the direction of the sound, thus associating the speaker unit 2 with the speaker unit 2 in the image.

As can be understood from the above description of the embodiment, this specification discloses various technical ideas including the inventions described below.

A speaker location identifying system according to the invention includes: a camera which acquires a photographed image; an image recognition unit which recognizes an image of a speaker included in the photographed image; a location unit which specifies a position of the speaker, based on a position in the photographed image of the recognized speaker; and a parameter decision unit which decides a parameter of an audio signal outputted to the speaker, based on the specified position of the speaker.

A speaker location identifying method according to the invention includes: acquiring a photographed image from a camera; recognizing an image of a speaker included in the acquired photographed image; specifying a position of the speaker, based on a position and size in the photographed image of the recognized speaker; and deciding a parameter of an audio signal outputted to the speaker, based on the specified position of the speaker.

A speaker location identifying device according to the invention includes: an image recognition unit which recognizes an image of a speaker included in a photographed image acquired by a camera; a location unit which specifies a position of the speaker, based on a position and size in the photographed image of the recognized speaker; and a parameter decision unit which decides a parameter of an audio signal outputted to the speaker, based on the specified position of the speaker.

A program according to the invention is for causing a computer to function as: an image recognition unit which recognizes an image of a speaker included in a photographed image acquired by a camera; and a location unit which specifies a position of the speaker, based on a position and size in the photographed image of the recognized speaker. An information storage medium according to the invention is a computer-readable information storage medium in which the program is recorded.

In an embodiment of the invention, the location unit may specify the position of the speaker, based on the position and size in the photographed image of the recognized speaker.

In an embodiment of the invention, the image recognition unit may recognize the image of the speaker included in the photographed image, based on data representing a shape of the speaker, the data being stored in a storage unit.

In an embodiment of the invention, the parameter decision unit may decide a channel of an audio signal allocated to the speaker, based on the specified position of the speaker.

In an embodiment of the invention, the image recognition unit may recognize an image of the speaker included in the photographed image and an image of a remote controller or a person included in the photographed image. The location unit may further specify a position of a listener, based on the image of the remote controller or the person included in the photographed image. The parameter decision unit may decide a parameter of an audio signal allocated to the speaker, based on the specified position of the speaker and the specified position of the listener.

In an embodiment of the invention, if images of a plurality of speakers included in the photographed image are recognized, the location unit may determine whether there are a plurality of speakers of the same shape, of the plurality of speakers.

In an embodiment of the invention, if it is determined that there are a plurality of speakers of the same shape, the location unit may output a highly directional sound to one of the plurality of speakers of the same shape and specify the positions of the plurality of speakers, based on the sound detected by a microphone attached to one of the plurality of speakers.

In an embodiment of the invention, if it is determined that there are a plurality of speakers of the same shape, the location unit may transmit a signal to cause the plurality of speakers of the same shape to output a sound or light, and specify the positions of the plurality of speakers, based on the sound or light outputted by the plurality of speakers.

In an embodiment of the invention, the location unit may detect one or more speakers situated in the same room as the camera, and determine whether there is a speaker that is not recognized in the photographed image, of the detected one or plurality of speakers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A speaker location identifying system comprising:
   at least one processor;

a camera which acquires a photographed image; and
at least one memory device that stores a plurality of instructions, which when executed by the at least one processor, causes the at least one processor to operate to:
specify a position of a speaker, based on a position of the speaker in the photographed image; and
decide a parameter of an audio signal outputted to the speaker, based on the specified position of the speaker,
wherein if images of a plurality of speakers are included in the photographed image, the at least one processor determines whether there are a plurality of speakers of the same shape, of the plurality of speakers, and
wherein if it is determined that there are a plurality of speakers of the same shape, the at least one processor outputs a highly directional sound to one of the plurality of speakers of the same shape and specifies the positions of the plurality of speakers, based on the sound detected by a microphone attached to one of the plurality of speakers.

2. The speaker location identifying system according to claim 1, wherein,
the at least one processor specifies the position of the speaker, based on the position and size of the speaker in the photographed image.

3. The speaker location identifying system according to claim 1, wherein
the at least one processor decides a channel of an audio signal allocated to the speaker, based on the specified position of the speaker.

4. The speaker location identifying system according to claim 1, wherein
the at least one processor further specifies a position of a listener, based on an image of a remote controller or a person included in the photographed image, and
the at least one processor decides a parameter of an audio signal allocated to the speaker, based on the specified position of the speaker and the specified position of the listener.

5. The speaker location identifying system according to claim 1, wherein
the at least one processor recognizes an image of a speaker included in the photographed image.

6. The speaker location identifying system according to claim 5, wherein
the at least one processor recognizes the image of the speaker included in the photographed image, based on data representing a shape of the speaker, the data being stored in a storage unit.

7. A speaker location identifying system comprising:
at least one processor;
a camera which acquires a photographed image; and
at least one memory device that stores a plurality of instructions, which when executed by the at least one processor, causes the at least one processor to operate to:
specify a position of a speaker, based on a position of the speaker in the photographed image; and
decide a parameter of an audio signal outputted to the speaker, based on the specified position of the speaker,
wherein if images of a plurality of speakers are included in the photographed image, the at least one processor determines whether there are a plurality of speakers of the same shape, of the plurality of speakers, and
wherein if it is determined that there are a plurality of speakers of the same shape, the at least one processor transmits a signal to cause the plurality of speakers of the same shape to output a sound or light, and specifies the positions of the plurality of speakers, based on the sound or light outputted by the plurality of speakers.

8. The speaker location identifying system according to claim 7, wherein,
the at least one processor specifies the position of the speaker, based on the position and size of the speaker in the photographed image.

9. The speaker location identifying system according to claim 7, wherein
the at least one processor decides a channel of an audio signal allocated to the speaker, based on the specified position of the speaker.

10. The speaker location identifying system according to claim 7, wherein
the at least one processor further specifies a position of a listener, based on an image of a remote controller or a person included in the photographed image, and
the at least one processor decides a parameter of an audio signal allocated to the speaker, based on the specified position of the speaker and the specified position of the listener.

11. The speaker location identifying system according to claim 7, wherein
the at least one processor recognizes an image of a speaker included in the photographed image.

12. The speaker location identifying system according to claim 11, wherein
the at least one processor recognizes the image of the speaker included in the photographed image, based on data representing a shape of the speaker, the data being stored in a storage unit.

13. A speaker location identifying system comprising:
at least one processor;
a camera which acquires a photographed image; and
at least one memory device that stores a plurality of instructions, which when executed by the at least one processor, causes the at least one processor to operate to:
specify a position of a speaker, based on a position of the speaker in the photographed image; and
decide a parameter of an audio signal outputted to the speaker, based on the specified position of the speaker,
wherein the at least one processor detects one or more speakers situated in the same room as the camera, and determines whether there is a speaker that is not recognized in the photographed image, of the detected one or plurality of speakers.

14. A speaker location identifying method comprising:
acquiring, with at least one processor operating with a memory device in a first device, a photographed image from a camera;
specifying, with the at least one processor operating with the memory device in the first device, a position of a speaker, based on a position and size of the speaker in the photographed image;
deciding, with at least one processor operating with a memory device in either the first device or a second device, a parameter of an audio signal outputted to the speaker, based on the specified position of the speaker;
determining, if images of a plurality of speakers are included in the photographed image, whether there are a plurality of speakers of the same shape, of the plurality of speakers; and
outputting, if it is determined that there are a plurality of speakers of the same shape, a highly directional sound to one of the plurality of speakers of the same shape and specifies the positions of the plurality of speakers, based on the sound detected by a microphone attached to one of the plurality of speakers.

15. The speaker location identifying method according to claim 14, wherein,
the specifying includes specifying the position of the speaker, based on the position and size of the speaker in the photographed image.

16. The speaker location identifying system according to claim 14, wherein
the deciding includes deciding a channel of an audio signal allocated to the speaker, based on the specified position of the speaker.

17. The speaker location identifying method according to claim 14, wherein
the specifying includes further specifying a position of a listener, based on an image of a remote controller or a person included in the photographed image, and
the deciding includes deciding a parameter of an audio signal allocated to the speaker, based on the specified position of the speaker and the specified position of the listener.

18. The speaker location identifying method according to claim 14, further comprising
recognizing an image of a speaker included in the photographed image.

19. A speaker location identifying method comprising:
acquiring, with at least one processor operating with a memory device in a first device, a photographed image from a camera;
specifying, with the at least one processor operating with the memory device in the first device, a position of a speaker, based on a position and size of the speaker in the photographed image;
deciding, with at least one processor operating with a memory device in either the first device or a second device, a parameter of an audio signal outputted to the speaker, based on the specified position of the speaker;
determining, if images of a plurality of speakers are included in the photographed image, whether there are a plurality of speakers of the same shape, of the plurality of speakers; and
transmitting, if it is determined that there are a plurality of speakers of the same shape, a signal to cause the plurality of speakers of the same shape to output a sound or light, so as to specify the positions of the plurality of speakers, based on the sound or light outputted by the plurality of speakers.

20. A speaker location identifying method comprising:
acquiring, with at least one processor operating with a memory device in a first device, a photographed image from a camera;
specifying, with the at least one processor operating with the memory device in the first device, a position of a speaker, based on a position and size of the speaker in the photographed image;
deciding, with at least one processor operating with a memory device in either the first device or a second device, a parameter of an audio signal outputted to the speaker, based on the specified position of the speaker; and
detecting one or more speakers situated in the same room as the camera, and determining whether there is a speaker that is not recognized in the photographed image, of the detected one or plurality of speakers.

* * * * *